United States Patent
Marshall et al.

(10) Patent No.: US 11,516,067 B1
(45) Date of Patent: Nov. 29, 2022

(54) COLLECTING METRIC INFORMATION BY SENSORS BASED ON DEVICE CHARACTERISTIC INFORMATION

(71) Applicant: Juniper Networks, Inc., Sunnyvale, CA (US)

(72) Inventors: Jeffrey S. Marshall, Santa Clara, CA (US); Iqlas M. Ottamalika, Cupertino, CA (US); Sri Ram Sankar, Bangalore (IN); Raghuram Malpe Pai, Bangalore (IN); Shashank Veerapaneni, San Jose, CA (US); Vijay Kumar Gadde, Bangalore (IN); Harsha Lakshmikanth, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/491,349

(22) Filed: Sep. 30, 2021

(30) Foreign Application Priority Data

Jun. 10, 2021 (IN) .............................. 202141025829

(51) Int. Cl.
*G06F 15/173* (2006.01)
*H04L 41/0213* (2022.01)
*H04L 43/04* (2022.01)
*H04L 41/12* (2022.01)

(52) U.S. Cl.
CPC .......... *H04L 41/0213* (2013.01); *H04L 41/12* (2013.01); *H04L 43/04* (2013.01)

(58) Field of Classification Search
CPC ..................................................... H04L 43/04
USPC ....................................................... 709/224
See application file for complete search history.

(56) References Cited

U.S. PATENT DOCUMENTS

| | | | |
|---|---|---|---|
| 9,276,826 B1* | 3/2016 | Dickson | .................. H04L 49/00 |
| 10,200,248 B1 | 2/2019 | Jiang et al. | |
| 10,516,761 B1* | 12/2019 | A | ............................. H04L 43/06 |
| 11,394,622 B1* | 7/2022 | Kozlova | ............. G06F 3/04817 |
| 2016/0173608 A1* | 6/2016 | Laflen | ..................... H04L 67/12 |
| | | | 702/188 |
| 2018/0189163 A1 | 7/2018 | Megahed et al. | |
| 2018/0191596 A1 | 7/2018 | Bhaya et al. | |

(Continued)

FOREIGN PATENT DOCUMENTS

EP  3961987 A1  3/2022

OTHER PUBLICATIONS

Bjorklund, "Yang—A Data Modeling Language for the Network Configuration Protocol (NETCONF)," Internet Engineering Task Force, RFC 6020, Oct. 2010, 173 pp.

(Continued)

*Primary Examiner* — Hee Soo Kim
(74) *Attorney, Agent, or Firm* — Shumaker & Sieffert, P.A.

(57) ABSTRACT

A method includes determining, by a controller device that manages a plurality of network devices, device characteristic information for a network device of the plurality of network devices and selecting, by the controller device, one or more sensors from a plurality of sensors based on the device characteristic information for the network device. The method further includes outputting, by the controller device, an instruction to cause the network device to generate the one or more selected sensors at the network device and receiving, by the controller device, sensor information from the one or more selected sensors generated at the network device.

20 Claims, 6 Drawing Sheets

(56) References Cited

U.S. PATENT DOCUMENTS

2020/0186449 A1* 6/2020 Tofighbakhsh ......... H04L 43/04
2020/0313985 A1* 10/2020 Jayakumar .............. H04L 43/04
2020/0412622 A1* 12/2020 Sherwood ............... H04L 41/40

OTHER PUBLICATIONS

Enns, "NETCONF Configuration Protocol," Network Working Group, RFC 4741, Dec. 2006, 95 pp.
Harrington et al., "An Architecture for Describing Simple Network Management Protocol (SNMP) Management Frameworks," Network Working Group, RFC 3411, Dec. 2002, 64 pp.
Extended Search Report from counterpart European Application No. 22164484.2 dated Aug. 22, 2022, 10 pp.

* cited by examiner

COLLECTING METRIC INFORMATION BY SENSORS BASED ON DEVICE CHARACTERISTIC INFORMATION

This application claims priority to Indian Provisional Patent Application No. 202141025829, filed on Jun. 10, 2021, the entire contents of which is incorporated herein by reference.

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for collecting metric information for network devices. A network management system (NMS) device, also referred herein as a controller or controller device, may be configured to translate high-level configuration (e.g., intents received from an administrator for a plurality of managed network devices) to low-level configuration (to be applied to the managed network devices themselves). characteristics and configure the devices to collect sensor information using the selected sensor.

In some instances, the controller and device combination may support metric collection of one or more metrics (e.g., telemetry information, CPU information, etc.) using more than one sensor. As used herein, a sensor may comprise one or more instructions configured to collect sensor information for particular type of metric using a mechanism associated with the sensor. For example, a first sensor may be configured to cause the controller to collect a temperature at a chassis using a polling mechanism. Receiving sensor information using a polling mechanism may comprise receiving sensor information in response to outputting a request for the sensor information (e.g., a polling request). In this example, a second sensor may be configured to cause the controller to collect the temperature at the chassis using a streaming mechanism. Receiving sensor information using a streaming mechanism may comprise receiving the sensor information without a request. In some examples, sensors may be configured using a common protocol and to collect different metrics. For example, a first sensor may be configured to use a particular protocol to collect a temperature at a line card and a second sensor may be configured to use the particular protocol to collect a temperature at a chassis associated with the line card. In some examples, however, sensors may be configured using different protocols.

For example, a first device may support both a first protocol associated with a polling mechanism and a second protocol associated with an streaming mechanism. In this example, a second device may support only the first protocol associated with a polling mechanism. As such, the controller may use the first protocol associated with the polling mechanism for managed devices that only support the polling technique, whereas the controller may use the second protocol associated with the streaming mechanism for managed network devices that support the streaming mechanism. The polling mechanism may result in a higher network usage and cause a corresponding managed device to use a higher amount of computational processing power compared to the asynchronous technique.

In accordance with the techniques of the disclosure, the controller may be configured to select a sensor from a plurality of different sensors based on device characteristic information. For example, the controller may select the second protocol associated with an streaming mechanism for metric collection performed by the first device in response to a determination that the first device supports both the polling mechanism and the streaming mechanism. In this example, the controller may select the first protocol associated with the polling mechanism in response to a determination that the second device supports the first protocol and does not support the second protocol. For instance, the first device may be configured with a different software version (e.g., updated version) than the second device. In some instance, the first device may comprise different hardware than the second device (e.g., a different model and/or a different vendor). In this way, the controller may automatically select a sensor for collecting sensor information (e.g., metric collection), which may decrease a network usage and/or decrease computational processing power compared to systems that rely on a common sensor and/or an administrator to select a sensor.

In one example, a method comprises determining, by a controller device that manages a plurality of network devices, device characteristic information for a network device of the plurality of network devices and selecting, by the controller device, one or more sensors from a plurality of sensors based on the device characteristic information for the network device. The method further comprises outputting, by the controller device, an instruction to cause the network device to generate the one or more selected sensors at the network device and receiving, by the controller device, sensor information from the one or more selected sensors generated at the network device.

In another example, a controller device that manages a plurality of network devices, the controller device comprising one or more processing units implemented in circuitry and configured to determine device characteristic information for a network device of a plurality of network devices and select one or more sensors from a plurality of sensors based on the device characteristic information for the network device. The one or more processing units are further configured to output an instruction to cause the network device to generate the one or more selected sensors at the network device and receive sensor information from the one or more selected sensors generated at the network device.

In one example, a computer-readable storage medium having stored thereon instructions that, when executed, cause processing circuitry of a controller device that manages a plurality of network devices to determine device characteristic information for a network device of the plurality of network devices and select one or more sensors from a plurality of sensors based on the device characteristic information for the network device. The processor is further configured to output an instruction to cause the network device to generate the one or more selected sensors at the network device and receive sensor information from the one or more selected sensors generated at the network device.

The details of one or more examples are set forth in the accompanying drawings and the description below. Other features, objects, and advantages will be apparent from the description and drawings, and from the claims.

DETAILED DESCRIPTION

A device (e.g., a network switch) may provide multiple "sensors" for collecting metrics. Each sensor may have different efficiencies. For example, a controller may use simple network management protocol (SNMP), NETCONF, or an asynchronous data protocol (e.g., Junos telemetry interface (JTI) collection) to collect metric information (e.g., a CPU metric). Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. NETCONF is described in Enns, "NETCONF Configuration Protocol," Network Working Group, RFC 4741, December 2006, available at tools.ietf.org/html/rfc4741, the entire contents of which are incorporated herein by reference.

As such, a controller may use several different sensors to specify the metric based on the process that is being used for collecting. For instance, when applying SNMP, the controller may use an identifier (ID). When applying NETCONF, the controller may use a different process. Moreover, not all devices in a network support all different mechanisms.

Techniques described herein may cause a controller to provide metric information that ranks the efficiency for each sensor per metric. The controller may generate a database of device types and which of the sensors are available. A user (e.g., an administrator) can declare intent for metric capture at a high-level and the controller may determine which sensor to apply. The controller may provide a query interface that provides a high-level naming technique (e.g., high-level data collection model) that is independent of collection mechanism being used.

In this way, the controller may optimize a selection of the technique (SNMP, etc.) for collecting individual metrics. The controller may expose a metric data model to higher layers, analyzes characteristics for desired metric and determine a most optimal mechanism for collecting the particular metric from the individual devices. In some examples, the controller may automatically set up the collectors (e.g., sensors).

Figure 1:
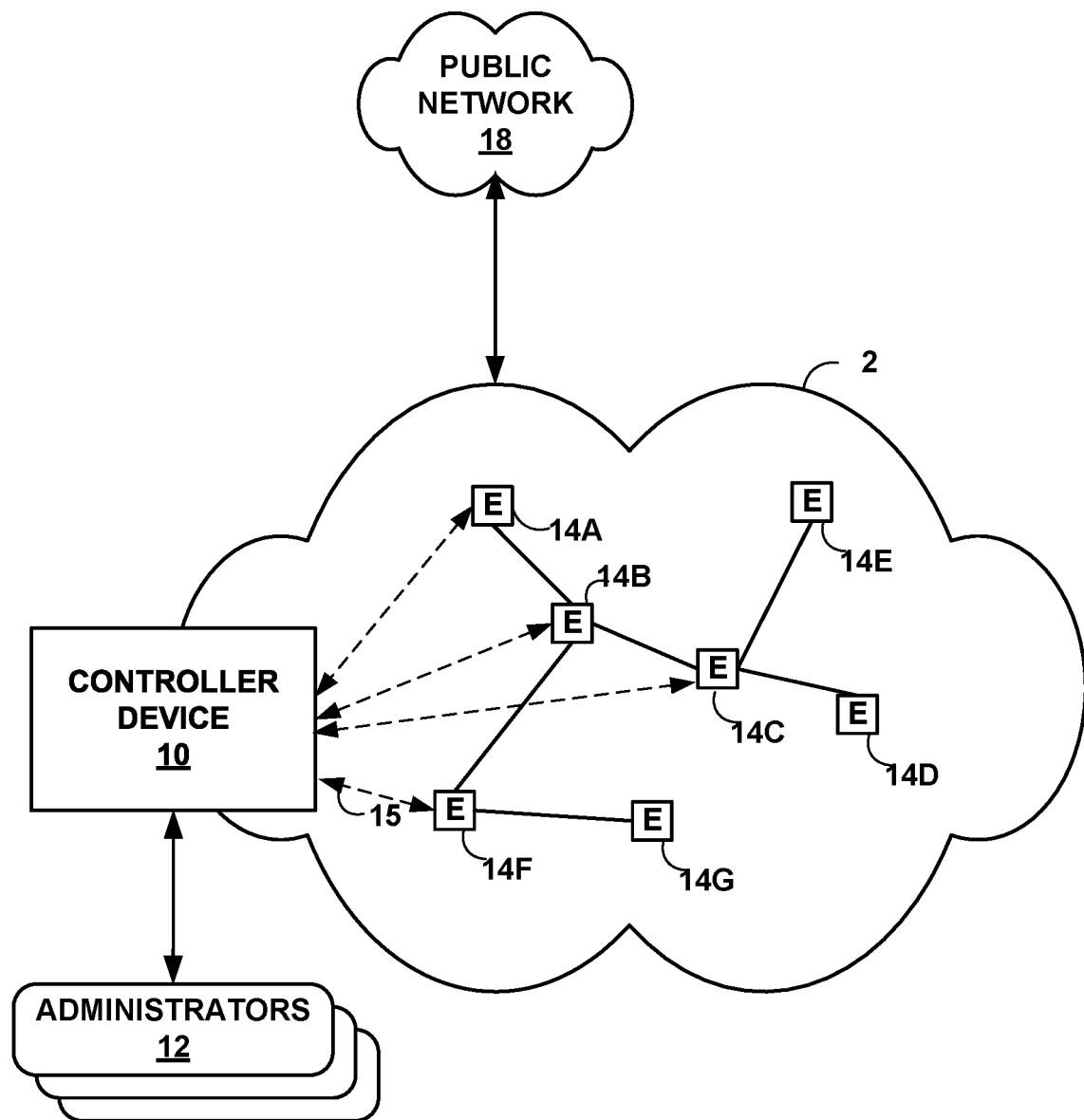
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12 uses controller device 10 to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In common practice, controller device 10, also referred to as a network management system (NMS) or NMS device, and elements 14 are centrally maintained by an IT group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrator 12 uses controller device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference. Controller device 10 may establish NETCONF sessions with one or more of elements 14.

Controller device 10 may be configured to accept high-level configuration data, or intents, from administrator 12 (which may be expressed as structured input parameters, e.g., according to YANG, which is described in Bjorklund, "YANG—A Data Modeling Language for the Network Configuration Protocol (NETCONF)," Internet Engineering Task Force, RFC 6020, October 2010, available at tools.ietf.org/html/rfc6020). Controller device 10 may also be configured to output respective sets of low-level device configuration data, e.g., device configuration additions, modifications, and removals. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference. This disclosure refers to low-level device configuration produced from intents (i.e., produced by compiling or translating the intents) as "device-level intent configuration information" or "intent configuration," to distinguish this device-level configuration from out of band (OOB) device-level configuration. In some examples, controller device 10 may use YANG modeling for an intent data model and low-level device configuration models. This data may contain relations across YANG entities, such as list items and containers. In some examples, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the intent data model. Controller device 10 may be configured to use the same compilation logic for each of create, update, and delete as applied to the graph model.

In general, controllers like controller device 10 use a hierarchical data model for intents, low-level data models, and resources. The hierarchical data model can be based on YANG or YAML. The hierarchical data model can be represented as a graph, as discussed above. Modern systems have supported intents to ease the management of networks. Intents are declarative. To realize intents, controller device 10 attempts to select optimal resources.

In accordance with the techniques of the disclosure controller device 10 may determine device characteristic information (e.g., a vendor, software version, or model) for each managed element (e.g., network device) of elements 14. For example, controller device 10 may receive the device characteristic information from administrator 12. In some examples, controller device may determine the one or more device requirements from information received from elements 14.

Controller device 10 may select one or more sensors from a plurality of sensors based on the device characteristic information for each of elements 14. For example, controller device 10 may select a sensor that uses a protocol supported by managed element 14A and that supports a streaming mechanism of sensor information. In this example, controller device 10 may output an instruction to cause managed element 14A to generate a sensor of the one or more sensors at the network device. For example, controller device 10 may output an instruction associated with the selected sensor that requests requesting metric collection according to a protocol. Controller device 10 may receive sensor information from the sensor. In this way, the controller device 10 may select, without input from administrator 12, a sensor for metric collection, which may decrease a network usage and/or decrease computational processing power compared to systems that rely on a common sensor and/or an administrator to select a sensor for metric collection.

Figure 2:
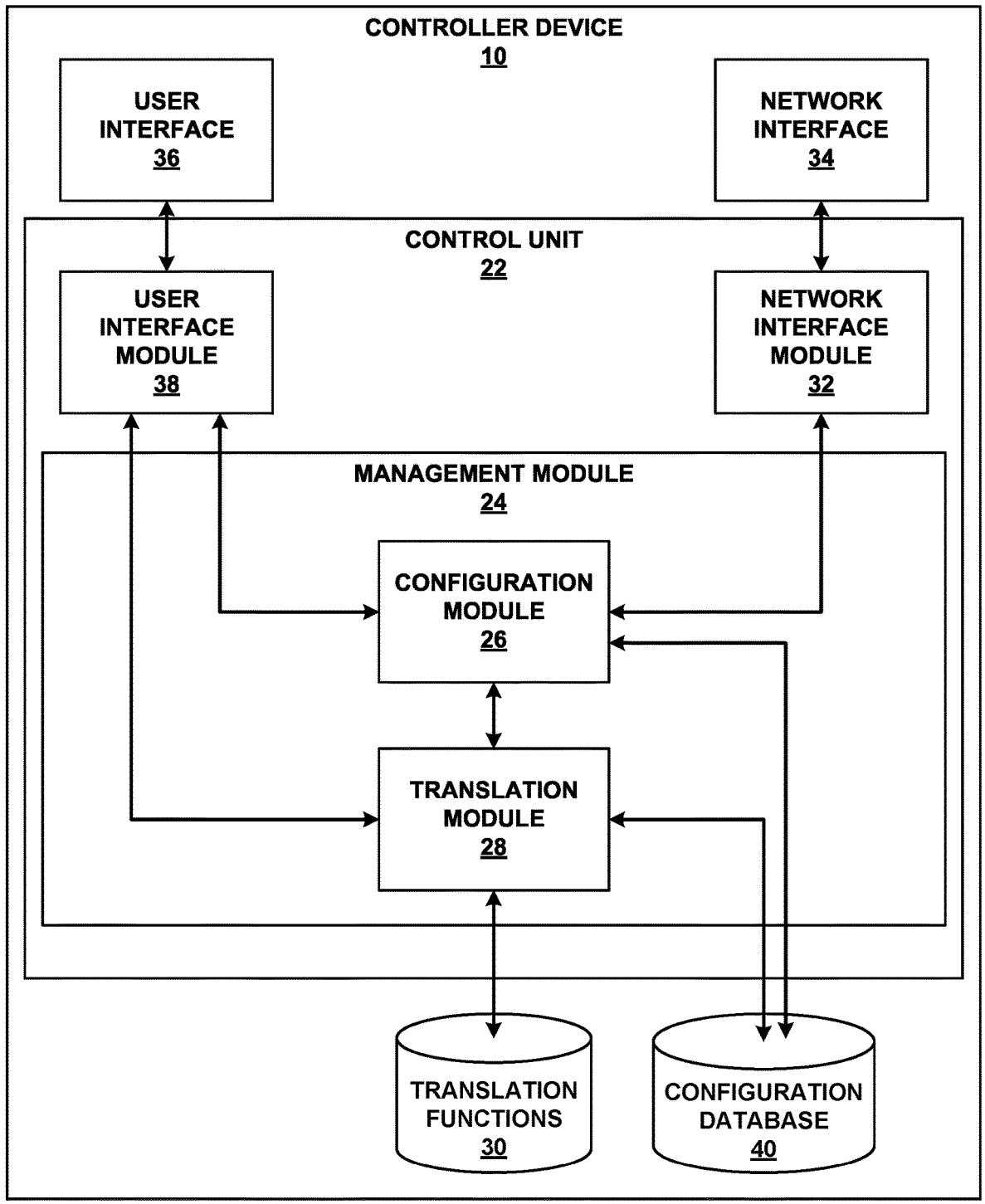
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive intents (e.g., high-level configuration instructions) for a set of managed network devices from a user, such as administrator 12. Over time, the user may update the configuration instructions, e.g., to add new services, remove existing services, or modify existing services performed by the managed devices. The intents may be structured according to, e.g., YANG. In some examples, management module 24 also provides the user with the ability to submit translation functions that translation module 28 executes to transform intents to device-specific, low-level configuration instructions, as discussed below.

Controller device 10 also includes configuration database 40. Configuration database 40 generally includes information describing managed network devices, e.g., elements 14. For example, configuration database 40 may include information indicating device identifiers (such as MAC and/or IP addresses), device type, device vendor, devices species (e.g., router, switch, bridge, hub, etc.), or the like. Configuration database 40 also stores device-level configuration information based on intents (e.g., high-level configuration information, or in some cases, both high-level configuration and low-level configuration information) for the managed devices (e.g., elements 14).

Translation module 28 determines which devices are managed using configuration database 40. Translation module 28 determines which of translation functions 30 to execute on the high-level configuration instructions based on the information of configuration database 40, e.g., which of the devices are to receive the low-level configuration instructions. Translation module 28 then executes each of the determined translation functions of translation functions 30, providing the high-level configuration instructions to the translation functions as input and receiving low-level configuration instructions. Translation module 28 may then provide the low-level configuration instructions to configuration module 26.

After receiving the low-level configuration instructions from translation module 28, configuration module 26 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrator 12 (FIG. 1) to interact with controller device 10, it should be understood that other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

In accordance with the techniques of the disclosure management module 24 may determine device characteristic information (e.g., a vendor, software version, or model) for each managed element (e.g., network device) of elements 14. For example, management module 24 may receive the device characteristic information from administrator 12. In some examples, controller device may determine the one or more device requirements from information received from elements 14.

Management module 24 may select one or more sensors from a plurality of sensors based on the device characteristic information for each network device of the plurality of devices. For example, controller device 10 may select a sensor and a protocol supported by managed element 14A and that supports asynchronous communication of sensor information. In this example, controller device 10 may output an instruction to cause managed element 14A to generate a sensor of the one or more sensors at the network device. For example, management module 24 may output an instruction associated with the selected sensor that requests requesting metric collection according to a protocol. Management module 24 may receive sensor information from the sensor. In this way, management module 24 may select, without input from administrator 12, a sensor for metric collection, which may decrease a network usage and/or decrease computational processing power compared to systems that rely on a common sensor and/or an administrator to select a sensor for metric collection.

Figure 3:
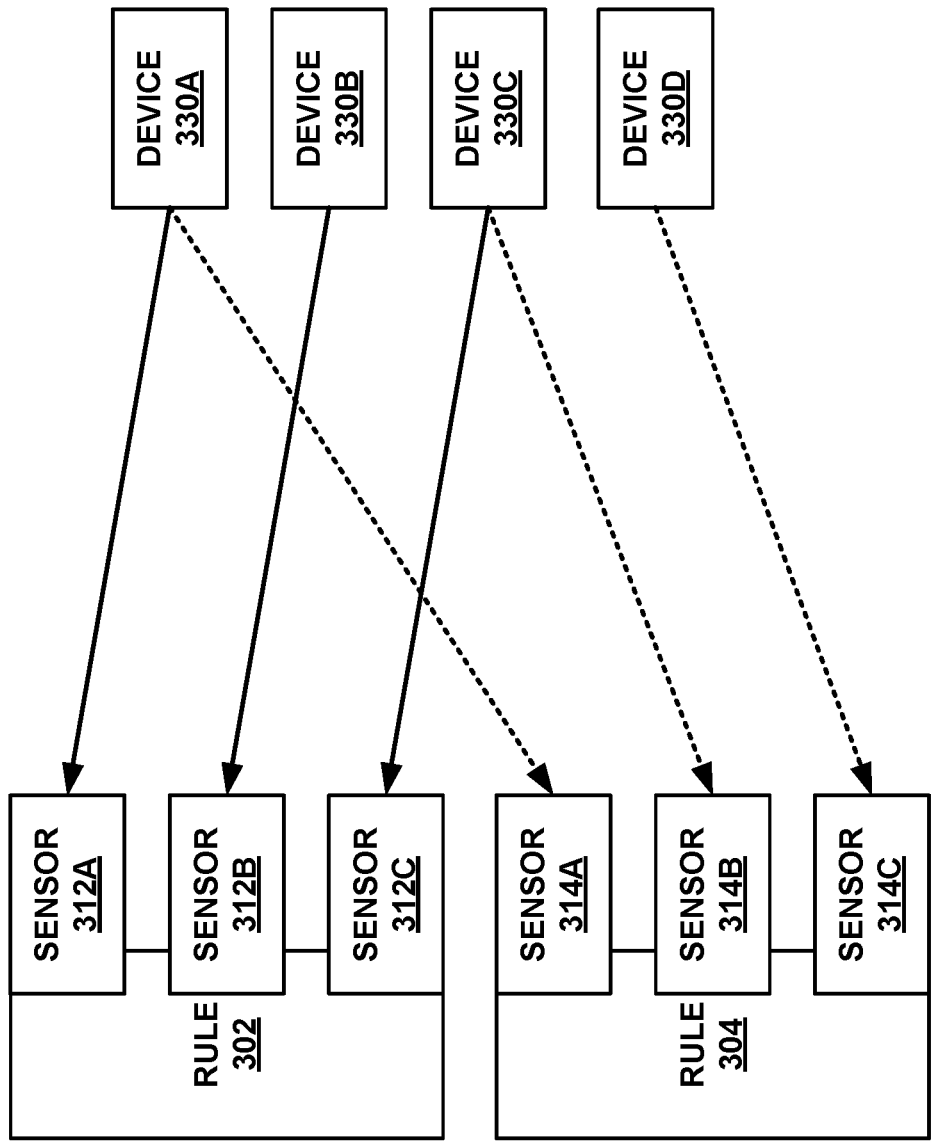
FIG. 3 is a conceptual diagram illustrating an example of sensors, in accordance with the techniques of this disclosure.

FIG. 3 is a conceptual diagram illustrating an example of sensors 312A, 312B, 312C (collectively, "sensors 312" and 314A, 314B, 314C (collectively, "sensors 314"), in accordance with the techniques of this disclosure. In the example of FIG. 3, controller device 10 may determine rule 302 for a first metric and rule 304 for a second metric. For example, rule 302 may be associated with a metric relating to a temperature and rule 304 may be associated with a metric relating to a status of interface cards. In this example, controller device 10 may execute one or more functions of rule 302 using the device characteristic information of devices 330A-330D (collectively, "devices 330") as an input to the one or more functions. In this example, controller device 10, with the one or more functions of rule 302, may select sensor 312A for device 330A, sensor 312B for device 330B, and sensor 312C for device 330C. Devices 330 may be examples of network devices and/or elements 14 of FIG. 1. Controller device 10 may output an instruction to cause device 330A to generate sensor 312A at device 330A, output an instruction to cause device 330B to generate sensor 312B at device 330B, and output an instruction to cause device 330C to generate sensor 312C at device 330C. In this example, sensors 312A-312C may output sensor information and controller device 10 may receive the sensor information.

Similarly, controller device 10 may execute one or more functions of rule 304 using the device characteristic information of devices 330 as an input to the one or more functions. In this example, controller device 10, with the one or more functions of rule 304, may select sensor 314A for device 330A, sensor 314B for device 330C, and sensor 314C for device 330D. Controller device 10 may output an instruction to cause device 330A to generate sensor 314A at device 330A, output an instruction to cause device 330C to generate sensor 314B at device 330C, and output an instruction to cause device 330D to generate sensor 314C at device 330D. In this example, sensors 314A-314C may output sensor information and controller device 10 may receive the sensor information.

Figure 4:
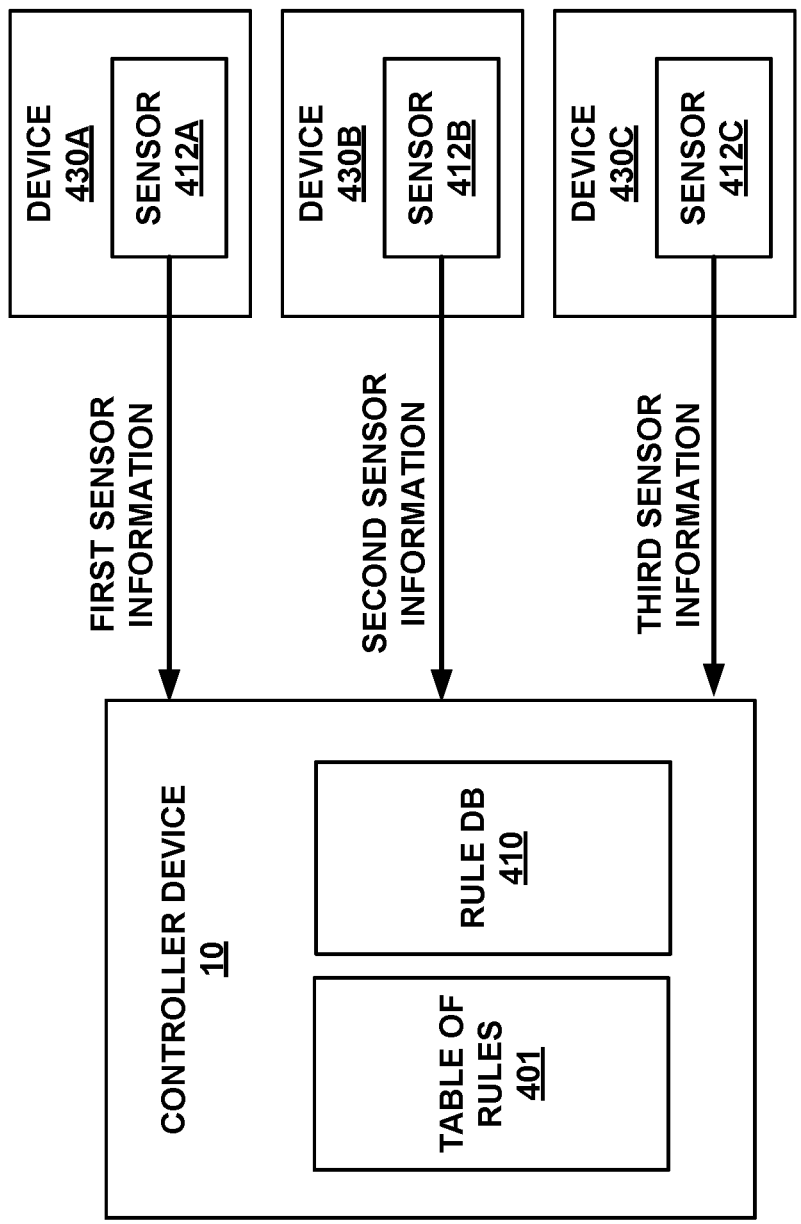
FIG. 4 is a conceptual diagram illustrating an example of a table of rules 401, in accordance with the techniques of this disclosure.

FIG. 4 is a conceptual diagram illustrating an example of a table of rules 401, in accordance with the techniques of this disclosure. In the example of FIG. 4, controller device 10 may determine device characteristic information for devices 430A-430C (collectively, devices 430). For instance, controller device 10 may determine whether each device of devices 430 supports a streaming mechanism for collecting sensor information, whether each device of devices 430 supports a polling mechanism for collecting sensor information, or whether each device of devices 430 supports both a streaming mechanism and a polling mechanism for collecting sensor information.

Controller device 10 may select a rule in a table of rules 401. For example, table of rules 401 may comprise a first column of metrics and a second column comprising a rule for each respective metric in the first column. Controller device 10 may select a rule in table of rules 401 based on a metric. For instance, controller device 10 may select a rule in table of rules 401 that is arranged in a row with the metric. In some examples, other data structures may be used to associate a metric with a rule.

Controller device 10 may execute the selected rule in rule database 410 using device characteristic information for devices 430 as an input to select sensors 412A-412C (collectively, "sensors 412"). For example, controller device 10, when executing the selected rule, may select sensor 412A to stream first sensor information when the device characteristic information for device 430A indicates that device 430A supports a streaming mechanism.

Controller device 10, when executing the selected rule, may select devices 430. For example, controller device 10, when executing the selected rule, may select devices 430A-430C in response to determining that devices 430A-430C support streaming sensor information instead of one or more other devices that do not support streaming sensor information.

Controller device 10, when executing the selected rule, may select a protocol for sending sensor information from sensors 412 to controller device 10. For example, controller device 10, when executing the selected rule, may select a first protocol for streaming first sensor information from sensor 412A and may select a second protocol for polling second sensor information from sensor 412B.

Controller device 10 may output an instruction to implement sensor 412A at device 430A, sensor 412B at device 430B, and sensor 412C at device 430C. Devices 430 each implement a respective one of sensors 412. Sensors 412 may generate respective sensor information and output the respective sensor information to controller device 10. For example, sensor 412A outputs first sensor information to controller device 10, sensor 412B outputs second sensor information to controller device 10, and sensor 412C outputs third sensor information to controller device 10.

Figure 5:
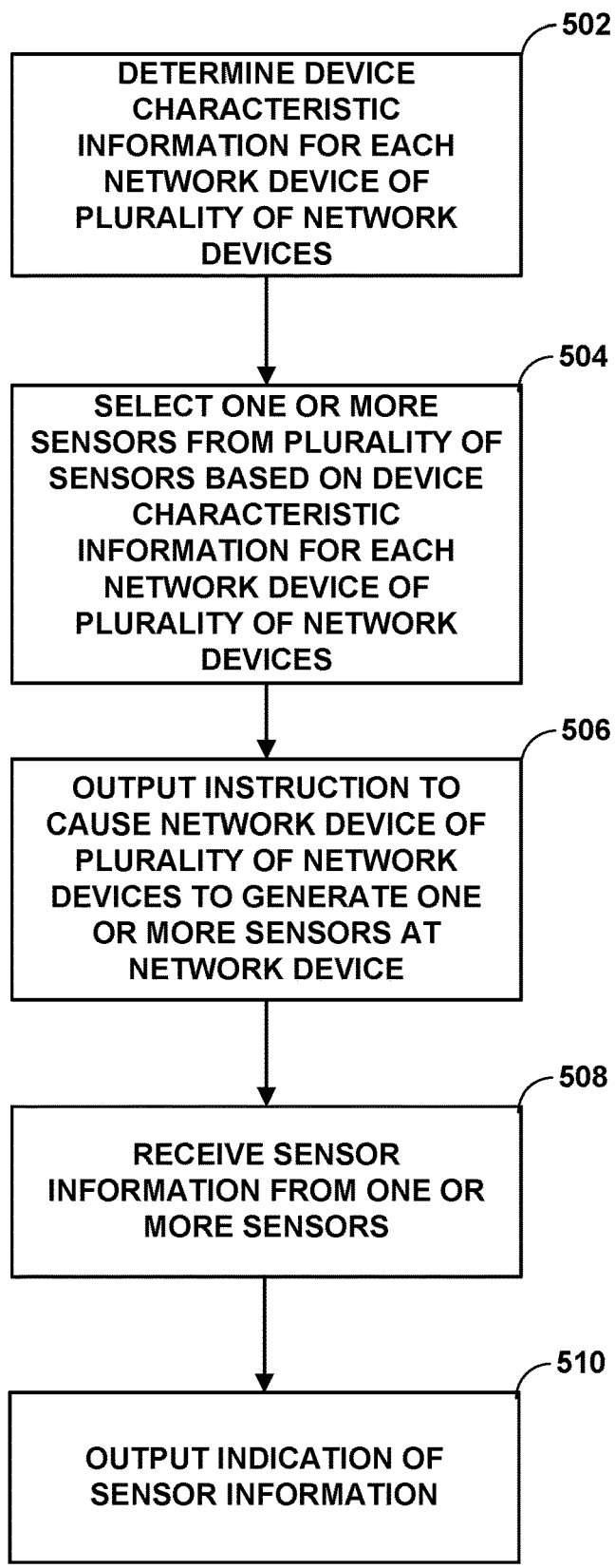
FIG. 5 is a flowchart illustrating an example process for metric collection based on device characteristic information, in according to techniques of this disclosure.

FIG. 5 is a flowchart illustrating an example process for metric collection based on device characteristic information, in according to techniques of this disclosure. The process of FIG. 5 may be performed by, e.g., controller device 10 of FIGS. 1 and 2 or other processing circuitry.

In accordance with the techniques of the disclosure, controller device 10 may determine device characteristic information for each network device (e.g., managed element 14) of a plurality of network devices (502). For example, controller device 10 may receive the device characteristic information from administrator 12 (e.g., during an onboarding of each network device). In some examples, controller device 10 may determine the one or more device requirements from information received from elements 14. The device characteristic information may comprises one or more of a software version, an operating system type (e.g., Junos, JunosEvolved, or Cisco IOSXR), a vendor, a product name (e.g., Juniper EX, MX, PTX), or a model number of one or more of elements 14. In some examples, the device characteristic information of the network device may comprise whether one or more of one or more of elements 14 supports streaming the sensor information.

Controller device 10 may select one or more sensors from a plurality of sensors based on the device characteristic information for each network device of the plurality of devices (504). For example, controller device 10 may determine a set of supported protocols based on the device characteristic information for the network device. In this example, controller device 10 may select the one or more sensors based on the set of supported protocols. The one or more protocols may comprise an asynchronous protocol, which may support a streaming mechanism. Examples of an asynchronous protocol may include OpenConfig, SNMP, or NETCONF. For example, the one or more protocols may comprise one or more of SNMP, NETCONF, OpenConfig, NetFlow, or Junos Telemetry Interface(JTI). In some examples, controller device 10 may select a protocol based on a ranking (e.g., a pre-configured ranking) of the protocols.

Controller device 10 may select a sensor based on whether the sensor supports a streaming mechanism. For example, controller device 10 may select a first sensor configured for streaming the sensor information from the plurality of sensors in response to determining that the device characteristic information for a network device indicates that the network device supports the streaming mechanism and/or the first sensor. In response, however, to determining that the device characteristic information for a network device indicates that the network device does not support the streaming mechanism, controller device 10 may select a second sensor configured for outputting the sensor information in response to one or more requests from the controller device 10 (e.g., a polling mechanism).

In some examples, controller device 10 may determine a metric based on an intent. For instance, controller device 10 may determine a metric of determining a memory status at each element of a set of elements 14 that are associated with a data center in response to an intent to monitor the memory stats at the data center. Controller device 10 may receive the intent from administrator 15. The metric may include one or more of an interface status, label-switched path (LSP) information, or central processing unit (CPU) information (e.g., a temperature). In some examples, the metric may include one or more of a memory status, a link status, round trip delay, or traffic. In this example, to select the one or more sensors, controller device 10 may select one or more sensors from a plurality of sensors based on the device characteristic information for each network device of the plurality of devices and further based on the metric. For example, controller device 10 may determine a subset of sensors of the plurality of sensors that are associated with the metric (e.g., are configured to generate the metric) and select the one or more sensors from the subset of sensors based on the device characteristic information for each network device of the plurality of devices.

For example, to determine the subset of the sensors, controller device 10 may determine a rule associated with the metric. The rule may include one or more functions. These functions may generally map device characteristic information and/or the metric to appropriate sensors to be used to collect data for the metric. Controller device 10 may execute one or more functions of the rule using the device characteristic information as an input to the one or more functions. Thus, controller device 10 may execute the one or more functions to select the one or more sensors. In some examples, the rule may be atomic, which may reduce a complexity of system 100. In this way, a user (e.g., a rule writer) may preconfigure rules to help to automate the selection of sensors according to device characteristic information, intents, and metrics associated with intents.

Controller device 10 may output an instruction to cause a network device (e.g., managed element 14A) of the plurality of network devices to generate one or more sensors at the network device (506). For example, controller device 10 may output an instruction associated with the selected sensor that requests requesting metric collection according to a protocol.

In some examples, controller device 10 may cause a network device to adapt to a change in the device characteristic information for the network device. For example, a network device (e.g., element 14A) may have been running an older version of an operating system type that does not support OpenConfig. In this example, controller device 10 may have selected the previous set of sensors to include a relatively inefficient sensor like SNMP instead of NETCONF or OpenConfig and output an instruction to cause the network device to generate the set of previous sensors at the network device. For instance, the previous set of sensors may not support a streaming mechanism. In this example, the network device provisions a software update at the network device and now supports NETCONF and OpenConfig. Controller device 10 may select the one or more sensors from the plurality of sensors in response to the change in the device characteristic information for the network device. For instance, the one or more sensors may support the streaming mechanism. For example, controller device 10 may select the one or more sensors to include NETCONF and/or OpenConfig which may be more efficient compared to SNMP. In this example, controller device 10 may output the instruction to cause the network device to change from the previous set of sensors (e.g., that do not support the streaming mechanism) to the one or more sensors (e.g., that support the streaming mechanism) in response to the change in the device characteristic information for the network device.

Controller device 10 may receive sensor information from the sensor (508). In this way, the controller device 10 may select, without input from administrator 12, a sensor for metric collection, which may decrease a network usage and/or decrease computational processing power compared to systems that rely on a common protocol and/or an administrator to select a protocol for metric collection.

Controller device 10 may output an indication of the sensor information (510). For example, controller device 10 may display a graphical representation of the sensor information. In some examples, controller device 10 may construct data defining a graphical representation and output the data defining the graphical representation. Controller device 10 may output the indication of the sensor information to another device (e.g., a server) for storage and/or display. In some examples, controller device 10 may determine that the sensor information comprises data representative of an anomaly. For instance, controller device 10 may determine that the sensor information comprises data representative of an anomaly in response to a determination that the sensor information indicates a temperature that is higher than a threshold value or a threshold value plus a baseline value (e.g., a previous set of measurements).

In some examples, controller device 10 may aggregate sensor information. For example, controller device 10 may output an instruction to cause the network device (e.g., managed element 14A) to generate one or more second sensors at the network device. In this example, controller device 10 may receive second sensor information from the one or more second sensors. Controller device 10 may determine aggregated sensor information based on the first sensor information and the second sensor information For example, controller device 10 may determine an average of a set of sensor information that comprises at least the first sensor information and the second sensor information. Controller device 10 may determine a maximum of a set of sensor information that comprises at least the first sensor information and the second sensor information. In some examples, controller device 10 may determine a minimum of a set of sensor information that comprises at least the first sensor information and the second sensor information. Controller device 10 may output an indication of the aggregate sensor information.

In some examples, controller device 10 may determine a disparity in sensor information. For example, controller device 10 may output an instruction to cause the network device (e.g., managed element 14A) to generate one or more second sensors at the network device. In this example, controller device 10 may receive second sensor information from the one or more second sensors. Controller device 10 may determine a disparity based on the first sensor information and the second sensor information For example, controller device 10 may determine that a temperature at element 14A is higher than element 14B by at least a threshold value. Controller device 10 may output an indication of the disparity.

In some examples, controller device 10 may normalize the sensor information to generate normalized sensor information. For example, controller device 10 may convert the sensor information from a first format to a second format. For instance, controller device 10 may convert a temperature from Celsius to Fahrenheit.

In some examples, controller device 10 may aggregate information from a network device to determine routing information. For example, the one or more sensors at the network device may comprise a first sensor configured to generate segment routing label switched path (SR-LSP) information, a second sensor configured to generate resource reservation protocol (RSVP) information, and a third sensor configured to generate color SR-LSP information. In this example, the sensor information may comprise the SR-LSP information, the RSVP information, and the color SR-LSP information. Controller device 10 may determine routing information for network packet routing based on the SR-LSP information, the RSVP information, and the color SR-LSP information and configure the network device based on the routing information.

Figure 6:
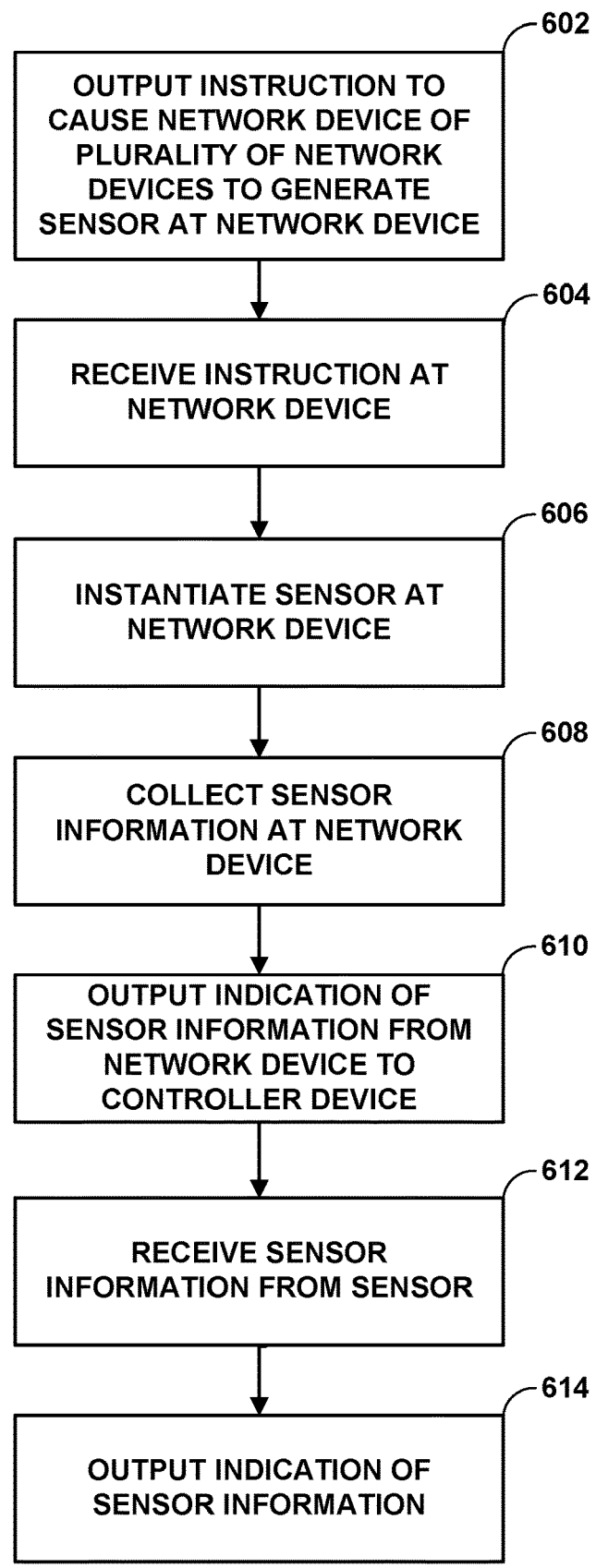
FIG. 6 is a flowchart illustrating an example process for collecting sensor information based on device characteristic information, in according to techniques of this disclosure.

FIG. 6 is a flowchart illustrating an example process for collecting sensor information based on device characteristic information, in according to techniques of this disclosure. In the example of FIG. 6, controller device 10 may output an instruction to cause network device 14A to generate a sensor at network device 14A (602). In some examples, controller device 10 may output the instruction to indicate the sensor. Controller device 10 may output the instruction to indicate a protocol.

For example, controller device 10 may perform one or more of steps 502-506 of FIG. 5. In this example, network device 14A may receive the instruction (604) and instantiate the sensors at network device 14A (606). For example, network device 14A may implement the sensor indicated in the instruction output by controller device 10.

Network device 14A may collect sensor information (608). For example, network device 14A may collect one or more interface statistics, LSP information, CPU information, or other sensor information. Network device 14A may output an indication of the sensor information to controller device 10 (610). For example, network device 14A may output the indication of the sensor information using one or more functions of the sensor implemented at network device 14A. In some examples, the one or more functions of the sensor may determine whether to stream the sensor information or use a polling mechanism to output the sensor information. Network device 14A may output the indication of the sensor information using a protocol indicated in the instruction output by controller device 10. For example, network device 14A may output the indication of the sensor information using SNMP when the instruction output by controller device 10 indicates SNMP.

Controller device 612 receives the sensor information from the sensor (612). For example, controller device 612 may be configured to receive the sensor information from the sensor using one or more of a technique associated with the sensor (e.g., streaming or polling) or a protocol specified in the instruction output to network device 14A. Controller device 612 may output an indication of the sensor information (614). For example, controller device 10 may display a graphical representation of the sensor information. In some examples, controller device 10 may construct data defining a graphical representation and output the data defining the graphical representation. Controller device 10 may output the indication of the sensor information to another device (e.g., a server) for storage and/or display.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
   determining, by a controller device that manages a plurality of network devices, device characteristic information for a network device of the plurality of network devices;
   selecting, by the controller device, one or more sensors from a plurality of sensors based on the device characteristic information for the network device;
   outputting, by the controller device, an instruction to cause the network device to generate the one or more selected sensors at the network device; and
   receiving, by the controller device, sensor information from the one or more selected sensors generated at the network device.

2. The method of claim 1, further comprising:
   outputting, by the controller device, an indication of the sensor information; and
   determining that the sensor information comprises data representative of an anomaly, wherein outputting the indication comprises outputting an indication of the data representative of the anomaly.

3. The method of claim 1, wherein selecting the one or more sensors comprises:
   determining a set of supported protocols based on the device characteristic information for the network device; and
   selecting the one or more sensors based on the set of supported protocols.

4. The method of claim 1, wherein the plurality of sensors comprises at least a first sensor configured for streaming the sensor information and a second sensor configured for outputting the sensor information in response to one or more requests from the controller device and wherein selecting the one or more sensors comprises selecting the first sensor in response to determining that the device characteristic information for the network device indicates that the network device supports the first sensor.

5. The method of claim 3, wherein the set of supported protocols comprise one or more of a simple network management protocol (SNMP), NETCONF, OpenConfig, NetFlow, or Junos Telemetry Interface (JTI).

6. The method of claim 1, further comprising determining a metric based on an intent, wherein selecting the one or more sensors is based on the device characteristic information for the network device and further based on the metric.

7. The method of claim 6, wherein selecting the one or more sensors comprises determining a subset of sensors of the plurality of sensors that are associated with the metric and selecting the one or more sensors from the subset of sensors based on the device characteristic information for the network device.

8. The method of claim 6, wherein selecting the one or more sensors comprises:
   determining a rule associated with the metric; and
   executing one or more functions of the rule using the device characteristic information as an input to the one or more functions, wherein the controller device, when executing the one or more functions, is configured to select the one or more sensors.

9. The method of claim 6, further comprising receiving the intent from an administrator.

10. The method of claim 6, wherein the metric comprises one or more of an interface status, label-switched path (LSP) information, or central processing unit (CPU) information.

11. The method of claim 1, wherein the device characteristic information of the network device comprises one or more of a software version, an operating system type, a vendor, a product name, or a model number.

12. The method of claim 1, wherein the device characteristic information of the network device comprises whether the network device supports streaming the sensor information.

13. The method of claim 1, further comprising receiving an indication of at least one of the device characteristic information of the network device from an administrator.

14. The method of claim 1, further comprising determining, by the controller device, at least one of the device characteristic information of the network device based on information received from the network device.

15. The method of claim 1, wherein the one or more selected sensors comprise one or more first sensors and wherein the sensor information is first sensor information, the method further comprising:
   outputting, by the controller device, an instruction to cause the network device to generate one or more second sensors at the network device;
   receiving, by the controller device, second sensor information from the one or more second sensors generated at the network device;
   determining, by the controller device, aggregated sensor information based on the first sensor information and the second sensor information; and
   outputting, by the controller device, an indication of the aggregated sensor information.

16. The method of claim 15, wherein determining the aggregated sensor information comprises one or more of determining an average of a set of sensor information that comprises at least the first sensor information and the second sensor information, determining a maximum of the set of sensor information, or determining a minimum of the set of sensor information.

17. The method of claim 1, wherein the one or more selected sensors comprises a first sensor, the network device is a first network device, and the sensor information is first sensor information, the method further comprising:
   outputting, by the controller device, an instruction to cause a second network device of the plurality of network devices to generate one or more second sensors at the second network device;
   receiving, by the controller device, second sensor information from the one or more second sensors generated at the second network device;
   determining, by the controller device, a disparity based on the first sensor information and the second sensor information; and
   outputting, by the controller device, an indication of the disparity.

18. The method of claim 1, further comprising normalizing the sensor information to generate normalized sensor information.

19. A controller device that manages a plurality of network devices, the controller device comprising one or more processing units implemented in circuitry and configured to:
   determine device characteristic information for a network device of a plurality of network devices;
   select one or more sensors from a plurality of sensors based on the device characteristic information for the network device;
   output an instruction to cause the network device to generate the one or more selected sensors at the network device; and
   receive sensor information from the one or more selected sensors generated at the network device.

20. A computer-readable storage medium having stored thereon instructions that, when executed, cause processing circuitry of a controller device that manages a plurality of network devices to:
   determine device characteristic information for a network device of the plurality of network devices;
   select one or more sensors from a plurality of sensors based on the device characteristic information for the network device;
   output an instruction to cause the network device to generate the one or more selected sensors at the network device; and
   receive sensor information from the one or more selected sensors generated at the network device.

* * * * *